United States Patent
Peng et al.

(10) Patent No.: US 9,225,428 B1
(45) Date of Patent: Dec. 29, 2015

(54) METHOD AND SYSTEM FOR ALIGNMENT OF PHOTODETECTOR ARRAY TO OPTICAL DEMULTIPLEXER OUTPUTS

(71) Applicant: Applied Optoelectronics, Inc., Sugar Land, TX (US)

(72) Inventors: Luohan Peng, Cypress, TX (US); Zhengyu Miao, Sugar Land, TX (US); Hao-Hsiang Liao, Sugar Land, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 22 days.

(21) Appl. No.: 14/465,240

(22) Filed: Aug. 21, 2014

(51) Int. Cl.
H04J 14/02 (2006.01)
H04B 10/60 (2013.01)
H04B 10/25 (2013.01)
H04Q 11/00 (2006.01)

(52) U.S. Cl.
CPC ............ *H04B 10/60* (2013.01); *H04B 10/2504* (2013.01); *H04J 14/02* (2013.01); *H04Q 11/0005* (2013.01); *H04Q 2011/0032* (2013.01)

(58) Field of Classification Search
CPC .................. H04J 14/02; H04Q 2011/0032
See application file for complete search history.

(56) References Cited

U.S. PATENT DOCUMENTS

| | | |
|---|---|---|
| 6,177,665 B1 | 1/2001 | Wolf |
| 6,493,121 B1 | 12/2002 | Althaus |
| 6,796,715 B2 | 9/2004 | Chiu et al. |
| 7,330,619 B2 | 2/2008 | Vernooy et al. |
| 2005/0018177 A1 | 1/2005 | Rosenberg et al. |
| 2006/0088255 A1 | 4/2006 | Wu et al. |
| 2006/0171642 A1 | 8/2006 | Tamanuki et al. |
| 2008/0069570 A1 | 3/2008 | Dallesasse |
| 2009/0087146 A1* | 4/2009 | Rolston ................ G02B 6/4214 385/52 |
| 2009/0202256 A1 | 8/2009 | Chen |
| 2009/0220248 A1 | 9/2009 | Hudgins |
| 2011/0058771 A1 | 3/2011 | Lee et al. |
| 2012/0087678 A1 | 4/2012 | Earnshaw |
| 2012/0189323 A1 | 7/2012 | Xu et al. |
| 2013/0084070 A1 | 4/2013 | Ho et al. |
| 2014/0161394 A1 | 6/2014 | Ho et al. |

OTHER PUBLICATIONS

PCT International Search Report mailed Oct. 3, 2014, received in corresponding PCT Application No. PCT/US14/37801, 14 pgs.
PCT International Search Report mailed Apr. 8, 2015, received in related PCT Application No. PCT/US14/67241, 13 pgs.
US Office Action mailed Apr. 30, 2015, received in related U.S. Appl. No. 14/088,883, pp. 1-43.

* cited by examiner

*Primary Examiner* — Shi K Li
(74) *Attorney, Agent, or Firm* — Grossman Tucker Perreault & Pfleger, PLLC; Norman S. Kinsella

(57) ABSTRACT

A system is provided for aligning a photodetector array to optical outputs of an optical demultiplexer in a multi-channel receiver optical subassembly (ROSA). In one embodiment, the system may include a clamp alignment fixture configured to secure a position of a photodetector mounting bar within a ROSA housing, wherein the photodetector array is disposed on the photodetector mounting bar and the photodetector array includes a plurality of photodiodes. The system may further include a motion staging device configured to adjust an orientation of the photodetector mounting bar by varying an angle of the clamp alignment fixture. The adjustment may be based on observation of the location of an optical alignment signal relative to the plurality of photodiodes, the optical alignment signal projected onto the photodetector mounting bar by the optical demultiplexer.

22 Claims, 10 Drawing Sheets

METHOD AND SYSTEM FOR ALIGNMENT OF PHOTODETECTOR ARRAY TO OPTICAL DEMULTIPLEXER OUTPUTS

TECHNICAL FIELD

The present disclosure relates to optical transceivers and more particularly, to aligning photodetectors to optical demultiplexer outputs in a multi-channel receiver optical subassembly (ROSA).

BACKGROUND INFORMATION

Optical communications networks, at one time, were generally "point to point" type networks including a transmitter and a receiver connected by an optical fiber. Such networks are relatively easy to construct but deploy many fibers to connect multiple users. As the number of subscribers connected to the network increases and the fiber count increases rapidly, deploying and managing many fibers becomes complex and expensive.

A passive optical network (PON) addresses this problem by using a single "trunk" fiber from a transmitting end of the network, such as an optical line terminal (OLT), to a remote branching point, which may be up to 20 km or more. One challenge in developing such a PON is utilizing the capacity in the trunk fiber efficiently in order to transmit the maximum possible amount of information on the trunk fiber. Fiber optic communications networks may increase the amount of information carried on a single optical fiber by multiplexing different optical signals on different wavelengths using wavelength division multiplexing (WDM). In a WDM-PON, for example, the single trunk fiber carries optical signals at multiple channel wavelengths to and from the optical branching point and the branching point provides a simple routing function by directing signals of different wavelengths to and from individual subscribers. In this case, each subscriber may be assigned one or more of the channel wavelengths on which to send and/or receive data.

To transmit and receive optical signals over multiple channel wavelengths, the OLT in a WDM-PON may include a multi-channel transmitter optical subassembly (TOSA), a multi-channel receiver optical subassembly (ROSA), and associated circuitry. One challenge with such OLT transceiver modules is accommodating the multi-channel TOSA, ROSA and circuitry in the relatively small space available in an OLT module. Designing a subassembly, such as the ROSA, with a smaller size presents potential problems with optical coupling between optical components in the subassembly. Limitations on the power budget of multiple channel optical transceivers present an additional challenge because higher receiver sensitivity may be required but difficult to achieve given the limited space for optical and opto-electronic components.

In the ROSA, multiple photodiodes are optically coupled to multiple outputs from an optical demultiplexer, such as an arrayed waveguide grating (AWG), for receiving multiple optical signals over multiple channels. Alignment of the photodiodes with the optical demultiplexer outputs is important to achieve the required sensitivity and coupling efficiency, but is generally difficult in the relatively confined space of the ROSA or OLT module. Expensive active alignment techniques and equipment are typically required for this process.

BRIEF DESCRIPTION OF THE DRAWINGS

These and other features and advantages will be better understood by reading the following detailed description, taken together with the drawings wherein.

DETAILED DESCRIPTION

A multi-channel receiver optical subassembly (ROSA), consistent with embodiments described herein, includes an optical demultiplexer, such as an arrayed waveguide grating (AWG), with outputs optically coupled to respective photodetectors such as photodiodes. The photodiodes may be mounted on a photodetector mounting bar. A passive alignment technique may be used to determine the mounting locations on the photodetector mounting bar such that the photodetectors are aligned with the optical outputs. In some embodiments, an active alignment technique may additionally be used to further refine the alignment. A compact multi-channel optical transceiver may include the multi-channel ROSA, and the optical transceiver may be used in a wavelength division multiplexed (WDM) optical system, for example, in an optical line terminal (OLT) in a WDM passive optical network (PON).

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. The term "coupled" as used herein refers to any connection, coupling, link or the like and "optically coupled" refers to coupling such that light from one element is imparted to another element. The term "directly optically coupled" refers to an optical coupling without any intermediate optical components such as lenses or fiber arrays.

Figure 1:
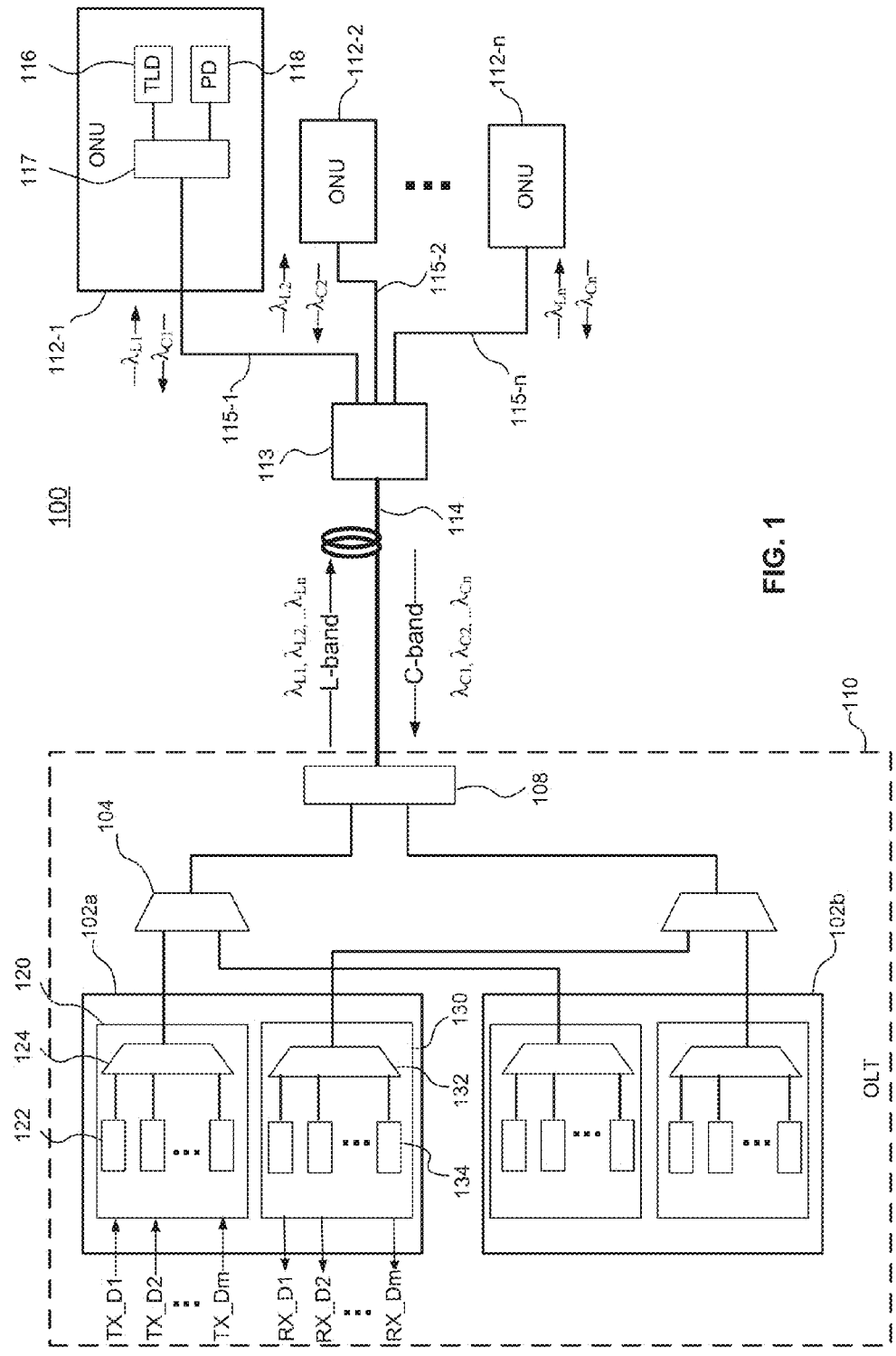
FIG. 1 is a functional block diagram of a wavelength division multiplexed (WDM) passive optical network (PON) including at least one compact multi-channel optical transceiver, consistent with embodiments of the present disclosure.

Referring to FIG. 1, a WDM-PON 100 including one or more multi-channel optical transceivers 102a, 102b, consistent with embodiments of the present disclosure, is shown and described. The WDM-PON 100 provides a point-to-multipoint optical network architecture using a WDM system. According to one embodiment of the WDM-PON 100, at least one optical line terminal (OLT) 110 may be coupled to a plurality of optical networking terminals (ONTs) or optical networking units (ONUs) 112-1 to 112-$n$ via optical fibers, waveguides, and/or paths 114, 115-1 to 115-$n$. Although the OLT 110 includes two multi-channel optical transceivers 102a, 102b in the illustrated embodiment, the OLT 110 may include one or more multi-channel optical transceivers.

The OLT 110 may be located at a central office of the WDM-PON 100, and the ONUs 112-1 to 112-$n$ may be located in homes, businesses or other types of subscriber location or premises. A branching point 113 (e.g., a remote node) couples a trunk optical path 114 to the separate optical paths 115-1 to 115-$n$ to the ONUs 112-1 to 112-$n$ at the respective subscriber locations. The branching point 113 may include one or more passive coupling devices such as a splitter or optical multiplexer/demultiplexer. In one example, the ONUs 112-1 to 112-$n$ may be located about 20 km or less from the OLT 110.

In the WDM-PON 100, different ONUs 112-1 to 112-$n$ may be assigned different channel wavelengths for transmitting and receiving optical signals. In one embodiment, the WDM-PON 100 may use different wavelength bands for transmission of downstream and upstream optical signals relative to the OLT 110 to avoid interference between the received signal and back reflected transmission signal on the same fiber. For example, the L-band (e.g., about 1565 to 1625 nm) may be used for downstream transmissions from the OLT 110 and the C-band (e.g., about 1530 to 1565 nm) may be used for upstream transmissions to the OLT 110. The upstream and/or downstream channel wavelengths may generally correspond to the ITU grid. In one example, the upstream wavelengths may be aligned with the 100 GHz ITU grid and the downstream wavelengths may be slightly offset from the 100 GHz ITU grid. The ONUs 112-1 to 112-$n$ may thus be assigned different channel wavelengths within the L-band and within the C-band.

The branching point 113 may demultiplex a downstream WDM optical signal (e.g., $\lambda_{L1}, \lambda_{L2}, \ldots \lambda_{Ln}$) from the OLT 110 for transmission of the separate channel wavelengths to the respective ONUs 112-1 to 112-$n$. Alternatively, the branching point 113 may provide the downstream WDM optical signal to each of the ONUs 112-1 to 112-$n$ and each of the ONUs 112-1 to 112-$n$ separates and processes the assigned optical channel wavelength. The branching point 113 also combines or multiplexes the upstream optical signals from the respective ONUs 112-1 to 112-$n$ for transmission as an upstream WDM optical signal (e.g., $\lambda_{C1}, \lambda_{C2}, \ldots \lambda_{Cn}$) over the trunk optical path 114 to the OLT 110.

One embodiment of the ONU 112-1 includes a laser 116, such as a laser diode, for transmitting an optical signal at the assigned upstream channel wavelength ($\lambda_{C1}$) and a photodetector 118, such as a photodiode, for receiving an optical signal at the assigned downstream channel wavelength ($\lambda_{L1}$). This embodiment of the ONU 112-1 may also include a diplexer 117 coupled to the laser 116 and the photodetector 118.

The OLT 110 may be configured to generate multiple optical signals at different channel wavelengths (e.g., $\lambda_{L1}$, $\lambda_{L2}, \ldots \lambda_{Ln}$) and to combine the optical signals into the downstream WDM optical signal carried on the trunk optical fiber or path 114. Each of the OLT multi-channel optical transceivers 102a, 102b may include a multi-channel transmitter optical subassembly (TOSA) 120 for generating and combining the optical signals at the multiple channel wavelengths. The OLT 110 may also be configured to separate optical signals at different channel wavelengths (e.g., $\lambda_{C1}$, $\lambda_{C2}, \ldots \lambda_{Cn}$) from an upstream WDM optical signal carried on the trunk path 114 and to receive the separated optical signals. Each of the OLT multi-channel optical transceivers 102a, 102b may thus include a multi-channel receiver optical subassembly (ROSA) 130 for separating and receiving the optical signals at multiple channel wavelengths. As will be described in greater detail below, the multi-channel TOSA 120 and ROSA 130 are configured and arranged to fit within a relatively small transceiver housing.

One embodiment of the multi-channel TOSA 120 includes an array of lasers 122, such as laser diodes, which may be modulated by respective RF data signals (TX_D1 to TX_Dm) to generate the respective optical signals. The lasers 122 may be modulated using various modulation techniques including external modulation and direct modulation. An optical multiplexer 124, such as an arrayed waveguide grating (AWG), combines the optical signals at the different respective downstream channel wavelengths (e.g., $\lambda_{L1}, \lambda_{L2}, \ldots \lambda_{Lm}$).

One embodiment of the multi-channel ROSA 130 includes a demultiplexer 132 for separating the respective upstream channel wavelengths (e.g., $\lambda_{C1}, \lambda_{C2}, \ldots \lambda_{Cn}$). An array of photodetectors 134, such as photodiodes, detects the optical signals at the respective separated upstream channel wavelengths and provides the received data signals (RX_D1 to RX_Dm). As described in greater detail below, the outputs of the demultiplexer 132 may be aligned with and directly optically coupled to the photodetectors 134 to provide a relatively high coupling efficiency. A diplexer 108 may be configured to couple the trunk optical path 114 to the OLT multi-channel optical transceivers 102a, 102b.

In one example, each of the multi-channel optical transceivers 102a, 102b may be configured to transmit and receive 16 channels such that the WDM-PON 100 supports 32 downstream L-band channel wavelengths and 32 upstream C-band channel wavelengths.

Figure 2:
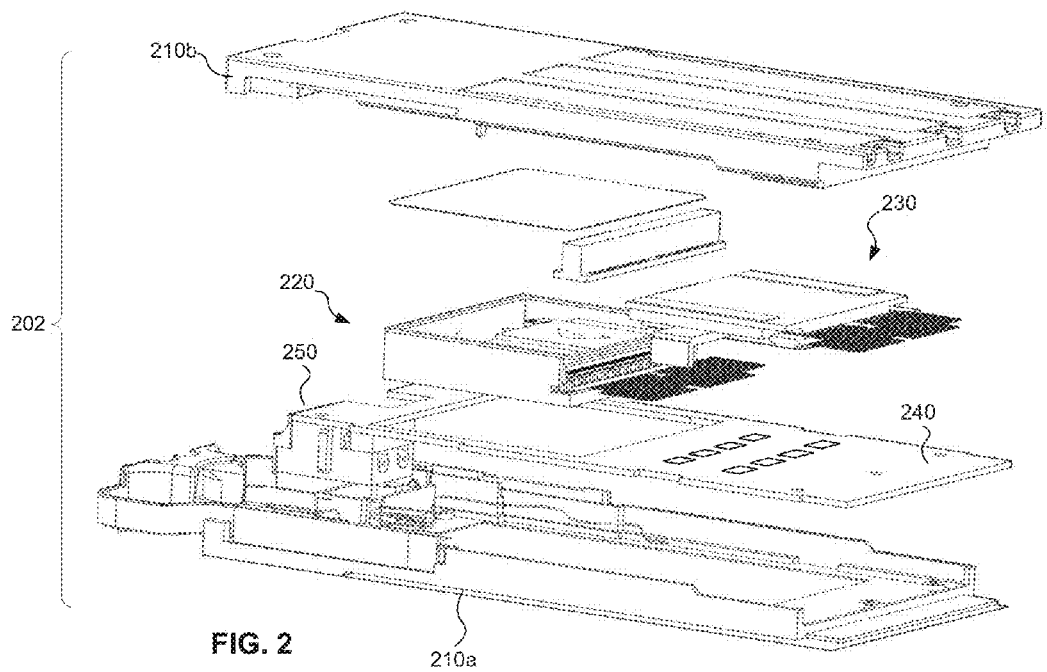
FIG. 2 is an exploded view of a compact multi-channel optical transceiver including a multi-channel TOSA, ROSA and circuit board, consistent with an embodiment of the present disclosure.
Figure 3:
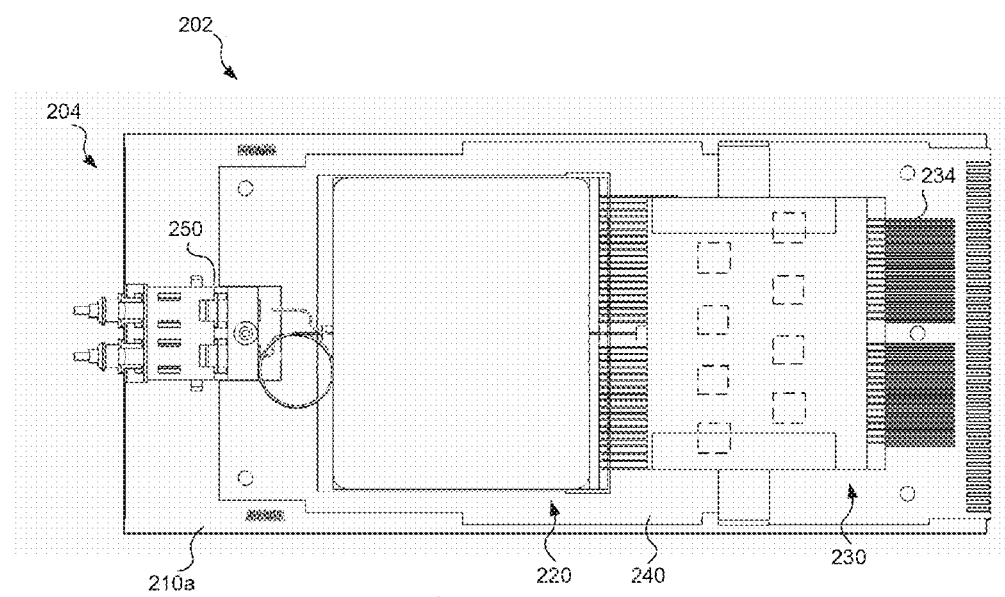
FIG. 3 is a top view inside the compact multi-channel optical transceiver shown in FIG. 2.

Referring to FIGS. 2 and 3, one embodiment of a compact multi-channel optical transceiver module 202 is shown and described in greater detail. As discussed above, multiple multi-channel transceiver modules may be used in an OLT of a WDM-PON to cover a desired channel range. The transceiver module 202 may thus be designed to have a relatively small form factor with minimal space. The compact optical transceiver module 202 generally provides an optical input and output at an optical connection end 204 and electrical input and output at an electrical connection end 206. The transceiver module 202 includes a transceiver housing 210a, 210b enclosing a multi-channel TOSA 220, a multi-channel ROSA 230, a circuit board 240, and a dual fiber adapter 250 directly linked to the TOSA 220 and the ROSA 230 for providing the optical input and output. The transceiver housing 210a, 210b may have a width of less than about 55 mm, a length of less than about 130 mm, and a height of less than about 10 mm. More specifically, one example of a transceiver housing 210 may have a width of 54.6 mm, a length of 110 mm, and a height of about 9.8 mm.

The multi-channel ROSA 230 includes a demultiplexer, such as an AWG, coupled to an array of photodetectors, such as photodiodes, as will be described in greater detail below. The printed circuit board 240 may include circuitry and electronic components such as laser diode drivers, control interfaces, and temperature control circuitry.

Figure 4:
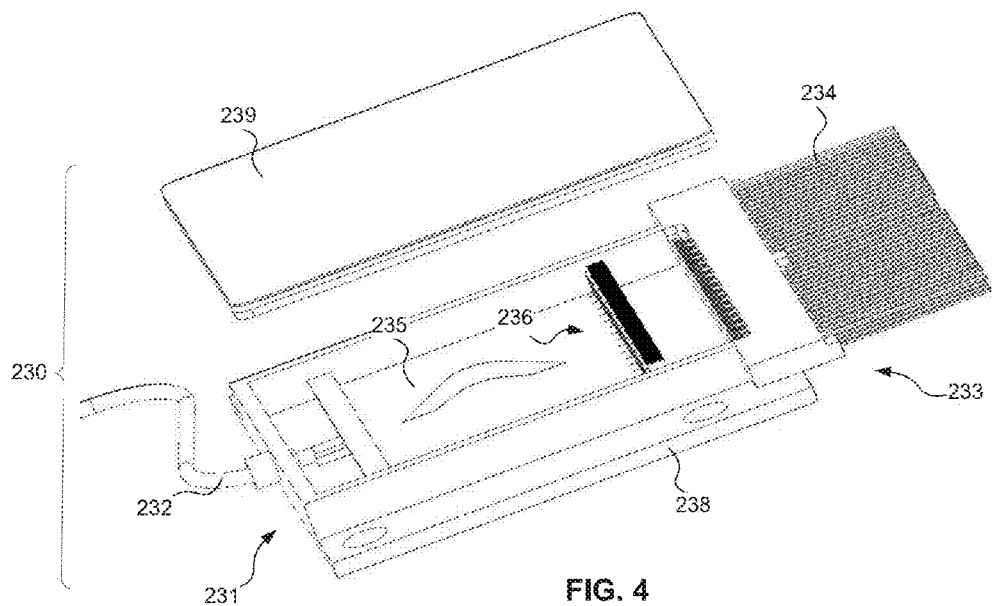
FIG. 4 is an exploded perspective view of a multi-channel ROSA for use in a compact multi-channel optical transceiver, consistent with an embodiment of the present disclosure.
Figure 5:
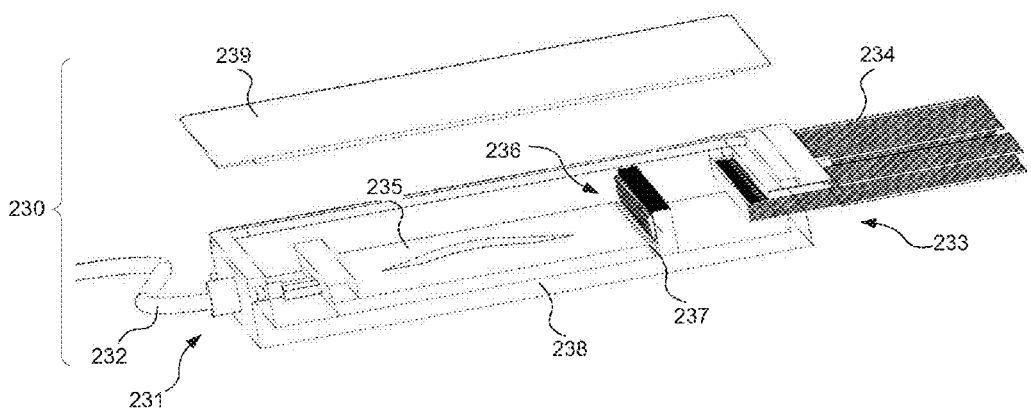
FIG. 5 is a cross-sectional view of the multi-channel ROSA shown in FIG. 4.

Referring to FIGS. 4 and 5, an embodiment of the multichannel ROSA 230 is described in greater detail. The ROSA 230 includes a demultiplexer 235, such as an AWG, mounted on a ROSA base portion 238. Optical outputs 237 of the demultiplexer 235 are optically coupled to an array of photodetectors 236, such as photodiodes. An input of the demultiplexer 235 is optically coupled to the input optical fiber 232 at the optical connection end 231 and the output of the photodetectors 236 are electrically connected to the ROSA pins 234 at the electrical connection end 233. A ROSA cover 239 covers the ROSA base portion 238 and encloses the demultiplexer 235 and array of photodetectors 236.

Figure 6:
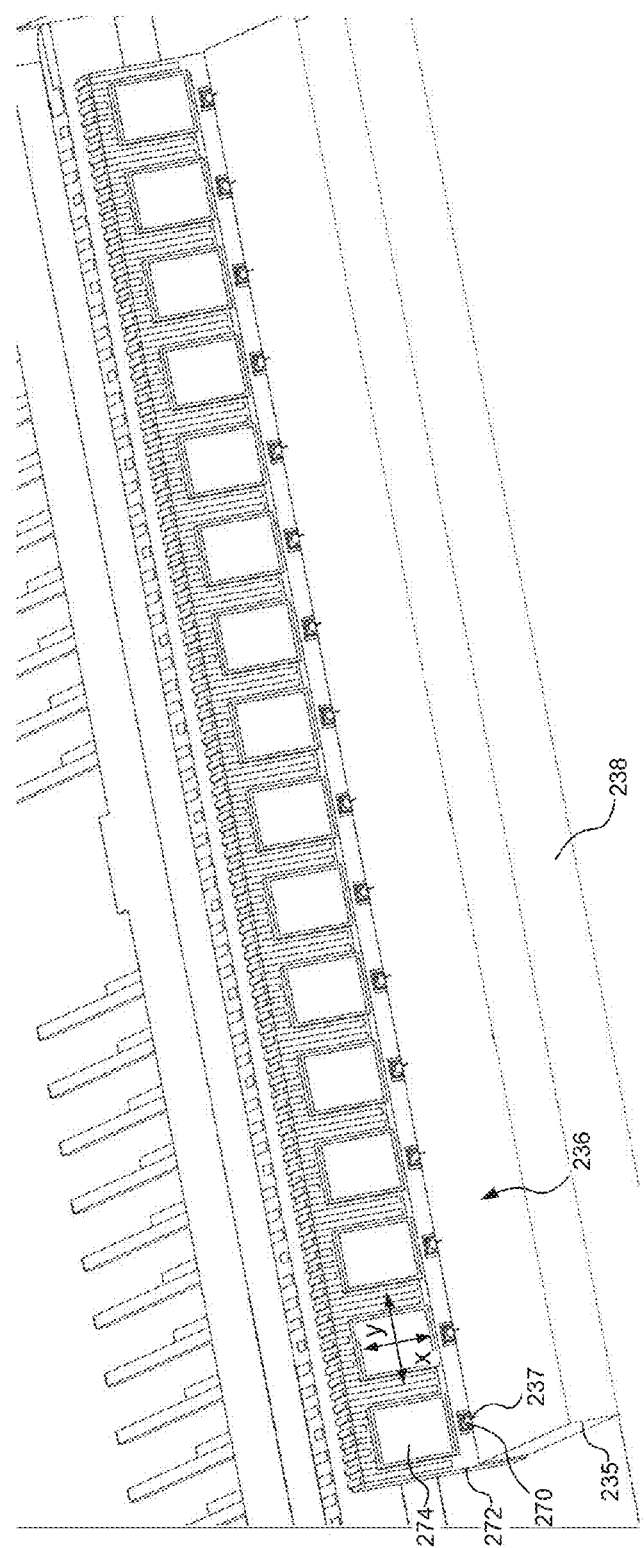
FIG. 6 is a cross-sectional front perspective view of the array of photodetectors directly optically coupled to the respective optical outputs of the optical demultiplexer in the ROSA shown in FIG. 4.
Figure 7:
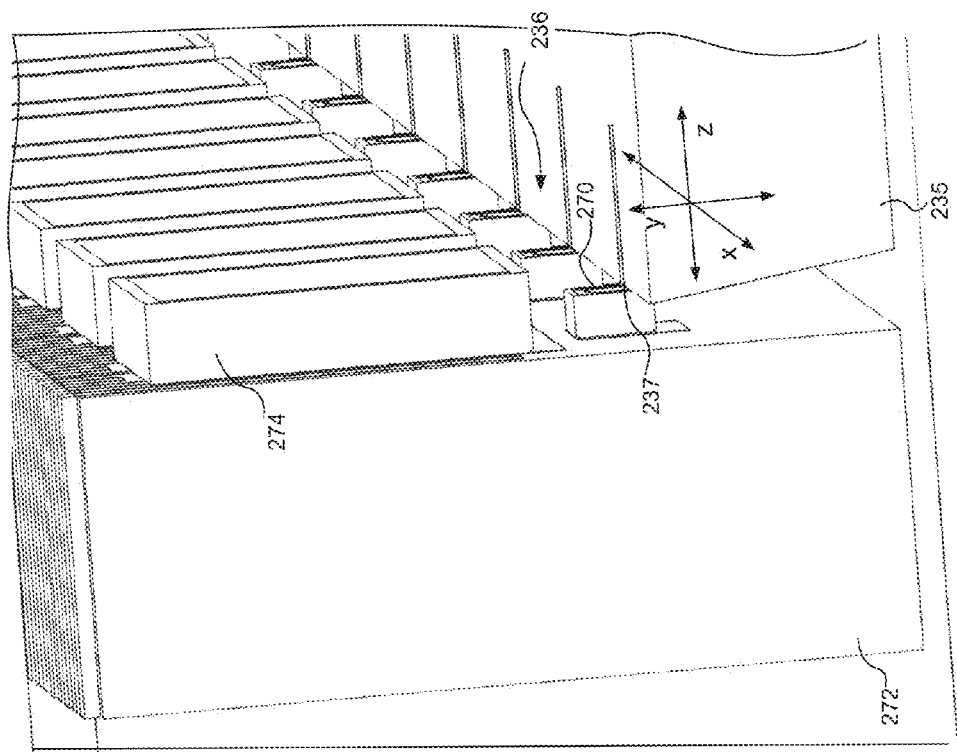
FIG. 7 is an enlarged, side perspective view of the array of photodetectors directly optically coupled to the respective optical outputs of the optical demultiplexer in the ROSA shown in FIG. 4.

Referring to FIGS. 6 and 7, direct optical coupling of the array of photodetectors 236 to the respective optical outputs 237 of the optical demultiplexer 235 is shown and described in greater detail. In the illustrated embodiment, the array of photodetectors 236 include photodiodes 270 mounted on a photodetector mounting bar 272 together with associated transimpedance amplifiers (TIAs) 274. In one example, the photodiodes 270 are aligned with and spaced from the optical outputs 237 of the demultiplexer 235 with a spacing that is close enough to achieve a coupling efficiency of 95% or greater with an alignment tolerance (i.e., in the X, Y axes) high enough to allow passive alignment (e.g., an alignment tolerance of at least about 20 microns). In one example, the photodiodes 270 may be spaced from the optical outputs 237 (i.e., in the Z axis) in a range of 10-40 microns, which allows a coupling efficiency greater than 95% and an alignment tolerance of about 20 microns. In the illustrated embodiment of a 16 channel ROSA, for example, 16 photodiodes 270 are aligned with 16 optical outputs 237 and electrically connected to 16 associated TIAs 274, respectively.

Referring to FIGS. 8-12, a passive alignment method is described in greater detail. Passive alignment generally refers to alignment without actively directing light into a photodiode and monitoring the photodiode output. This passive alignment method may be used to align each of the photodiodes 270 (e.g., in the X and Y axis) with each of the respective optical outputs 237 of the optical demultiplexer 235 to provide the desired coupling efficiency. In some embodiments, the alignment may include up to six degrees of freedom (e.g., X, Y and Z axis and pitch, yaw and roll). Although a passive alignment method is described herein, active alignment methods may additionally be used to provide further alignment of the photodetectors in the ROSA described above.

Figure 8:
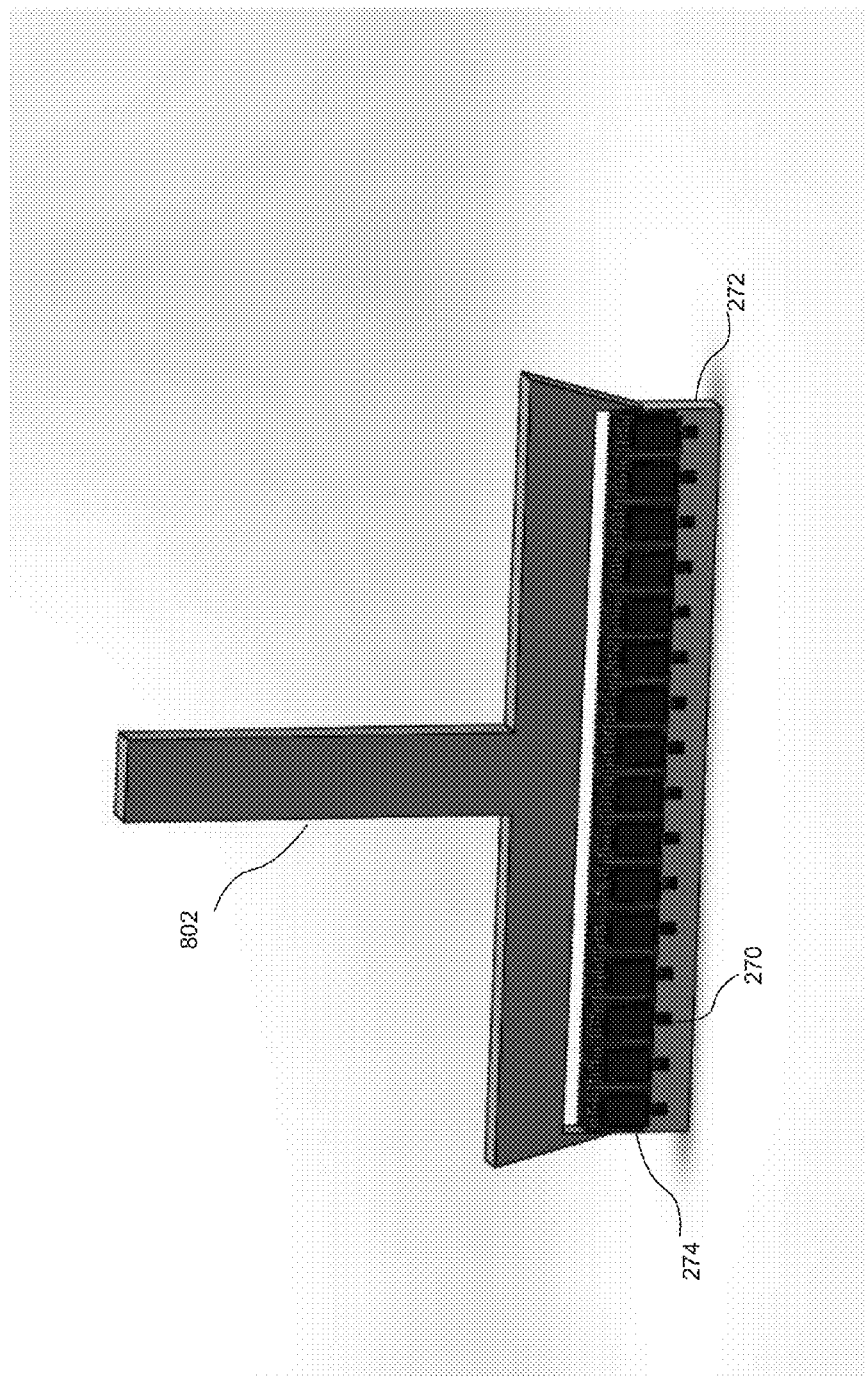
FIG. 8 illustrates a clamping alignment fixture consistent with an embodiment of the present disclosure.

FIG. 8 illustrates a clamping alignment fixture 802 consistent with an embodiment of the present disclosure. The fixture 802 may be configured to securely hold the photodetector mounting bar 272 prior to and during insertion into the ROSA housing as well as during the passive alignment procedure described herein and subsequent bonding of the then-aligned mounting bar 272 to the ROSA base portion 238. The fixture 802 may be configured to clamp onto the bar 272, and possess sufficient rigidity for secure manipulation during the alignment procedure. The fixture 802 may be further configured to subsequently release the bar 272 after conclusion of the alignment procedure.

Typical fabrication techniques allow for the TIAs 274 and photodiodes 270 to be positioned on the mounting bar 272 with greater ease and precision prior to insertion of the mounting bar in the ROSA housing where accessibility becomes more limited. The photodiodes 270 may thus be aligned with a required precision, relative to each other on the mounting bar as a photodetector array. The spacing of the photodiodes on the mounting bar may therefore be arranged to correspond to the spacing of the optical outputs of the demultiplexer 235. The mounting bar, however, will then need to be aligned relative to the optical demultiplexer 235 after insertion in the ROSA housing, as described below.

Figure 9:
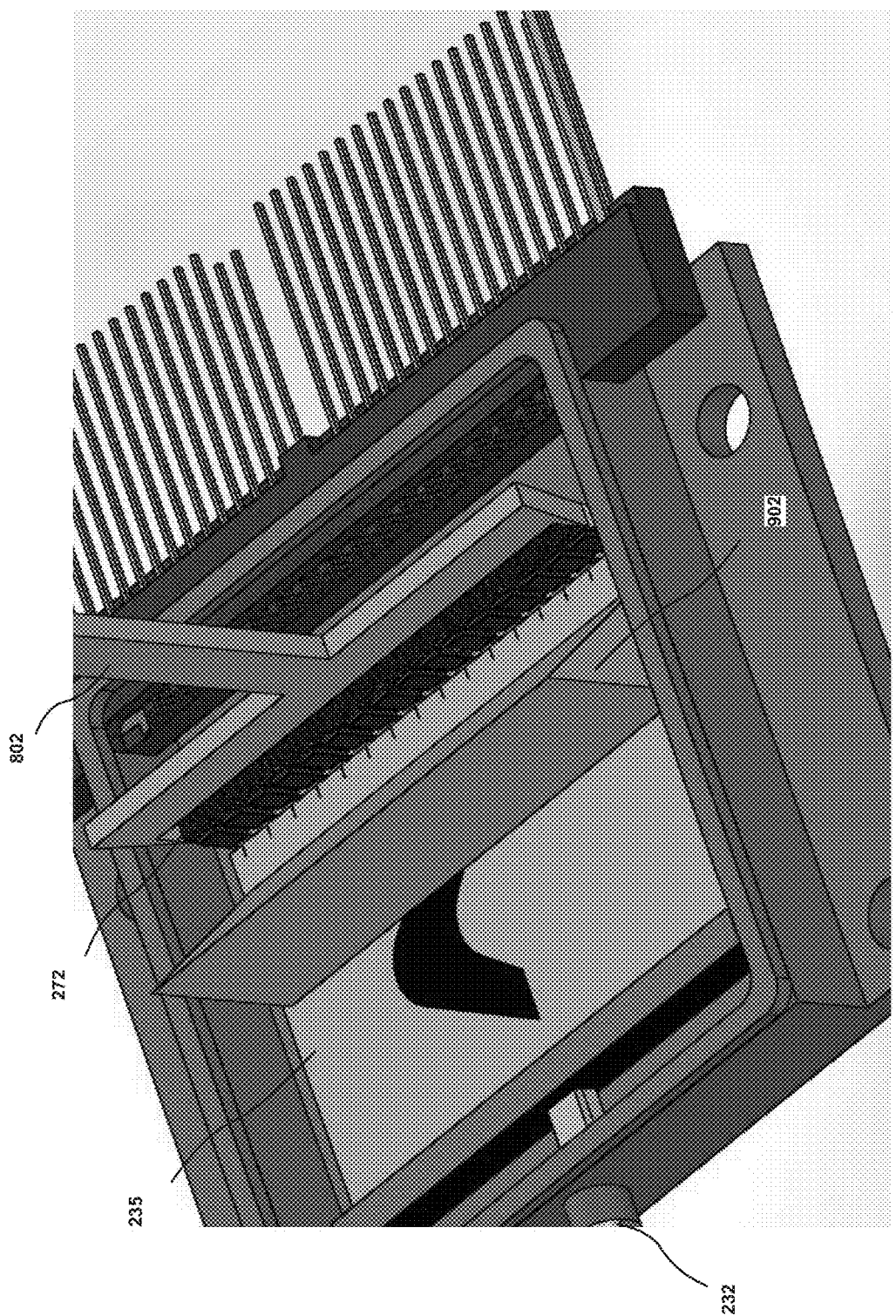
FIG. 9 illustrates the clamping alignment fixture holding a photodetector mounting bar in the ROSA housing during alignment, consistent with an embodiment of the present disclosure.

FIG. 9 illustrates the clamping alignment fixture 802 holding the mounting bar 272 in the ROSA housing during alignment of the bar (and photodetector array) with the demultiplexer 235 (e.g., an AWG). In some embodiments, a mirror 902, for example a 45 degree mirror, may be configured to enable observation of the photodiodes from a vantage point above the ROSA, during alignment. In some embodiments, other types of mirrors or optical devices may be used to provide viewing from any suitable vantage point or angle of observation. A laser optical signal, for example a red laser, may be introduced to the input optical fiber 232 which will then be split by demultiplexer 235 and projected onto each of the photodiodes 270 as a visual indicator to facilitate alignment of the mounting bar 272.

Figure 10:
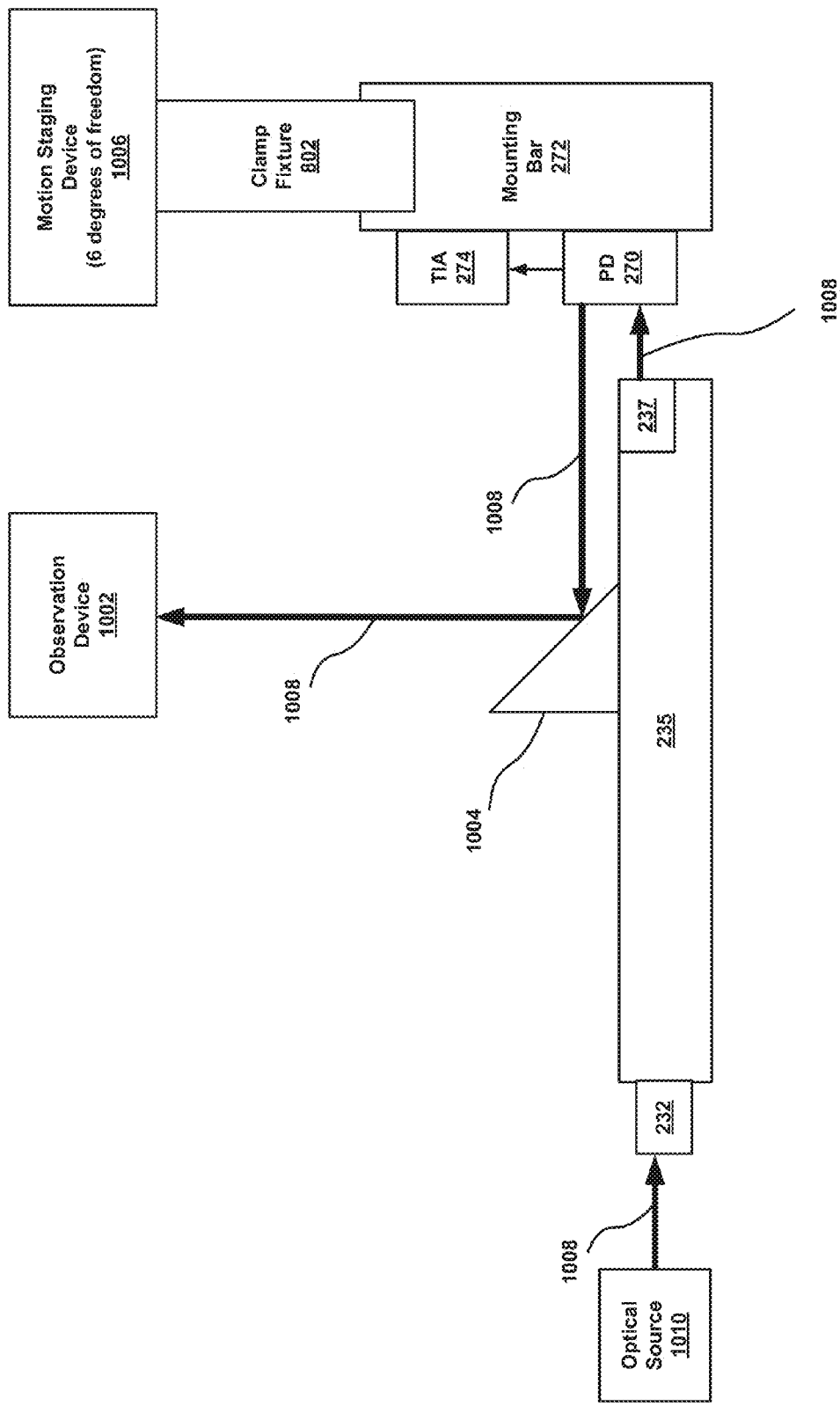
FIG. 10 provides a schematic illustration of the passive alignment process consistent with an embodiment of the present disclosure in greater detail.
Figure 11:
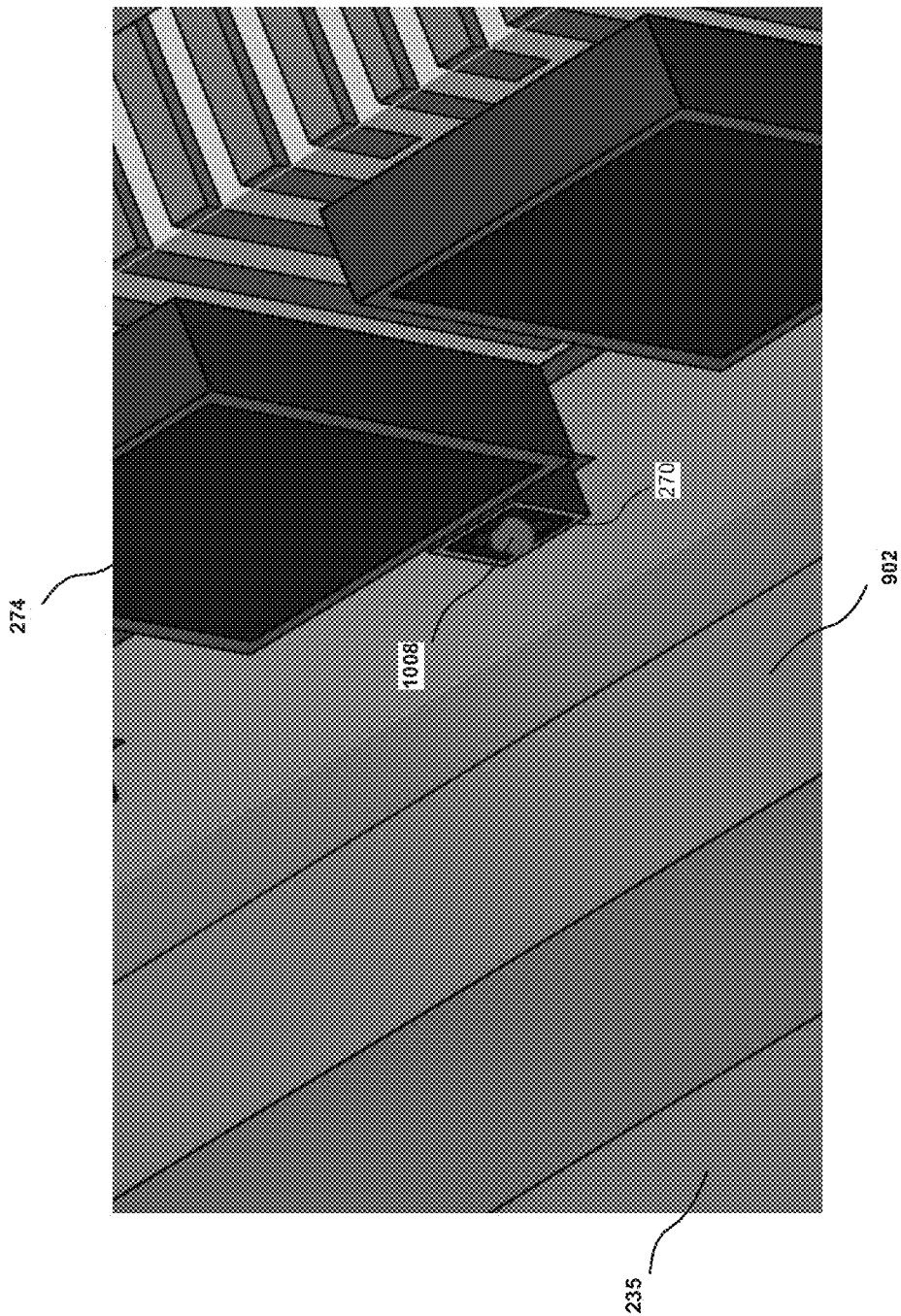
FIG. 11 provides an enlarged illustration is of an optical alignment signal illuminating a photodiode, consistent with an embodiment of the present disclosure.
Figure 12:
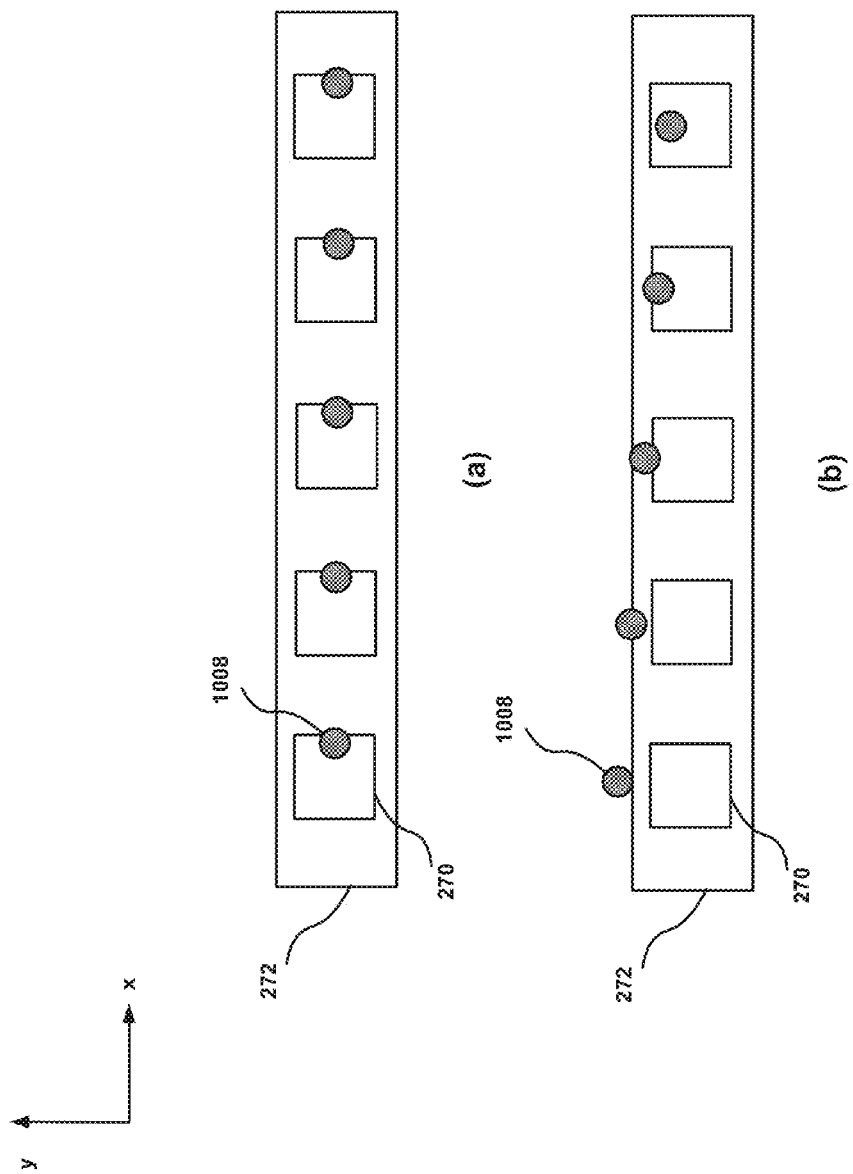
FIG. 12 illustrates examples of images optical alignment signals and associated positional adjustment, consistent with an embodiment of the present disclosure.

FIG. 10 provides a schematic illustration of the passive alignment process in greater detail. An optical signal 1008, provided by an optical source 1010 for the alignment process, is introduced to the input optical fiber 232 of the demultiplexer 235. The optical alignment signal 1008 may preferably be a red laser optical signal, although in some embodiments it may be a laser signal of other wavelengths and/or any other suitable type of optical signal including, for example, light from a light emitting diode (LED). The demultiplexer 235, which in some embodiments may be an AWG, may project this optical alignment signal 1008 onto each (e.g., two or more of the) of the photodiodes 270. Referring briefly to FIG. 11, an enlarged illustration is provided of the optical alignment signal 1008 illuminating and reflecting off of one of the photodiodes 270.

The reflection of optical alignment signal 1008, from the photodiodes 270, may be transmitted back to mirror 1004 which in turn reflects the signal 1008 up to observation device 1002. Because of the hazards associated with direct observation of a laser signal by the human eye, observation device 1002 may be employed to capture the image of the optical alignment signals 1008 on the photodiodes 270 in a relatively safe and convenient manner. In some embodiments, observation device 1002 may be a camera such as a charge coupled device (CCD) camera, or an imaging microscope of any suitable type. In an embodiment where the optical alignment signal 1008 is not a laser, direct observation may be possible and, in some embodiments, mirror 1004 may be omitted if a suitable angle of observation can be achieved without the mirror.

Motion staging device 1006 may be configured to adjust and control the orientation of mounting bar 272 by varying the angle of clamp fixture 802 through various degrees of freedom of motion. In some embodiments, up to 6 degrees of freedom of motion may be controlled including x-axis, y-axis, z-axis, pitch, roll and yaw. An operator, or an automated computer system, may control the motion staging device 1006 based on the image obtained by observation device 1002 showing the apparent location of the optical alignment signals 1008 relative to the photodiodes 270. So, for example, and with reference to FIG. 12(a), the image of the optical alignment signals 1008 indicates that the mounting bar 272 would need to be moved to the right (positive x-axis direction). As another example, and with reference to FIG. 12(b), the image of the optical alignment signals 1008 indicates that the mounting bar 272 would need to be rotated clockwise in the x,y plane and raised upward in the positive y-axis direction.

In some embodiments, motion staging device 1006 and clamp fixture 802 may be capable of controlling motion of the mounting bar 272 with a tolerance of about 1 micron.

In some embodiments, visual indicators may be disposed (e.g., engraved, painted, etc.) on or near the face of photodiode or the mounting bar to provide an indication to the operator that the optical alignment signal 1008 is within an acceptable distance relative to the photodiode.

In some embodiments, passive alignment, as described herein, may be used as a procedure for coarse alignment to be followed by active alignment for additional refinement. During active alignment, the output of the photodiode is monitored for a received signal strength indication (RSSI) representing power or current output. An RSSI monitor (not shown) may be coupled to the TIAs to measure the RSSI. In some embodiments, the TIA includes an electrical pad for the RSSI output, through which the RSSI current may be measured. The position of the mounting bar 272 may be adjusted by relatively smaller amounts, as compared to those of the passive alignment process described previously, until a maximum RSSI is detected, at which point the alignment may be considered optimal or otherwise complete. These fine positional adjustments may be accomplished in the same manner as for passive alignment, that is, through control of the motion staging device 1006 and clamp fixture 802.

Upon completion of the alignment, whether passive or a combination of passive and active, the mounting bar may be secured to the ROSA base portion 238 with a suitable adhesive (e.g., ultraviolet (UV) epoxy, cement or glue). An injector device may be employed to apply the adhesive into a relatively small gap that may be left between the bottom of the mounting bar 272 and the top of the ROSA base portion 238. The clamp fixture 802 may securely hold the mounting bar in the aligned position until the adhesive cures, at which point the clamp fixture may be released. In some embodiments, the adhesive may be applied to the top of the ROSA base portion 238 before the mounting bar is positioned and aligned, after which the alignment process may be performed before the adhesive has time to cure.

Accordingly, a system is provided for passive alignment of a photodetector array to optical outputs of an optical demultiplexer in a multi-channel receiver optical subassembly (ROSA) with a relatively high coupling efficiency. An active alignment may also be implemented to further align the photodetectors with the optical outputs of the optical demultiplexer with an additional increase in coupling efficiency.

Consistent with an embodiment, the passive alignment system may include a clamp alignment fixture configured to secure a position of a photodetector mounting bar within a ROSA housing, wherein the photodetector array is disposed on the photodetector mounting bar and the photodetector array includes a plurality of photodiodes. The system may further include a motion staging device configured to adjust an orientation of the photodetector mounting bar by varying an angle of the clamp alignment fixture. The adjustment may be based on observation of the location of an optical alignment signal relative to the plurality of photodiodes, the optical alignment signal projected onto the photodetector mounting bar by the optical demultiplexer.

Consistent with another embodiment, a method is provided for aligning a photodetector array to optical outputs of an optical demultiplexer in a multi-channel receiver optical subassembly (ROSA). The method may include employing a clamp alignment fixture to secure a position of a photodetector mounting bar within a ROSA housing, wherein the photodetector array is disposed on the photodetector mounting bar and the photodetector array comprises a plurality of photodiodes. The method may also include observing the location of an optical alignment signal relative to the plurality of photodiodes, the optical alignment signal projected onto the photodetector mounting bar by the optical demultiplexer. The method may further include adjusting an orientation of the photodetector mounting bar by varying an angle of the clamp alignment fixture based on the observing.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system for aligning a photodetector array to optical outputs of an optical demultiplexer in a multi-channel receiver optical subassembly (ROSA), said system comprising:
   a clamp alignment fixture configured to secure a position of a photodetector mounting bar within a ROSA housing, wherein said photodetector array is disposed on said photodetector mounting bar and said photodetector array comprises a plurality of photodiodes; and
   a motion staging device configured to adjust an orientation of said photodetector mounting bar by varying an angle of said clamp alignment fixture, said adjustment based on observation of the location of an optical alignment signal relative to said plurality of photodiodes, said optical alignment signal projected onto said photodetector mounting bar by said optical demultiplexer.

2. The system of claim 1, wherein said plurality of photodiodes are arranged on said photodetector mounting bar at a spacing that corresponds to a spacing of said optical outputs of said optical demultiplexer.

3. The system of claim 1, wherein said motion staging device is further configured to adjust said orientation of said photodetector mounting bar within 6 degrees of freedom.

4. The system of claim 1, further comprising a mirror configured to enable observation of said optical alignment signal from a desired viewing angle.

5. The system of claim 1, further comprising an optical source configured to provide said optical alignment signal to said optical demultiplexer.

6. The system of claim 1, further comprising a charge coupled device (CCD) camera configured to perform said observation of said location of said optical alignment signal.

7. The system of claim 1, further comprising a received signal strength indication (RSSI) monitor configured to monitor output of said photodiodes.

8. The system of claim 7, wherein said motion staging device is further configured to adjust said orientation of said photodetector mounting bar based on said RSSI.

9. The system of claim 1, wherein said optical demultiplexer comprises an arrayed waveguide grating (AWG).

10. The system of claim 1, further comprising a plurality of transimpedance amplifiers (TIAs) disposed on said photodetector mounting bar, each of said TIAs electrically coupled to a respective one of said plurality of photodiodes.

11. The system of claim 1, wherein said optical demultiplexer comprises 16 of said optical outputs corresponding to 16 channels and said photodetector array comprises 16 photodiodes.

12. A method for aligning a photodetector array to optical outputs of an optical demultiplexer in a multi-channel receiver optical subassembly (ROSA), the method comprising:
- employing a clamp alignment fixture to secure a position of a photodetector mounting bar within a ROSA housing, wherein said photodetector array is disposed on said photodetector mounting bar and said photodetector array comprises a plurality of photodiodes;
- observing the location of an optical alignment signal relative to said plurality of photodiodes, said optical alignment signal projected onto said photodetector mounting bar by said optical demultiplexer; and
- adjusting an orientation of said photodetector mounting bar by varying an angle of said clamp alignment fixture based on said observing.

13. The method of claim 12, further comprising arranging said plurality of photodiodes on said photodetector mounting bar at a spacing that corresponds to a spacing of said optical outputs of said optical demultiplexer.

14. The method of claim 12, wherein said adjusting of said orientation of said photodetector mounting bar is performed within 6 degrees of freedom.

15. The method of claim 12, further comprising observing a reflection of said optical alignment signal in a mirror configured to enable observation from a desired viewing angle.

16. The method of claim 12, further comprising configuring an optical source to provide said optical alignment signal to said optical demultiplexer.

17. The method of claim 12, further comprising employing a charge coupled device (CCD) camera to perform said observation of said location of said optical alignment signal.

18. The method of claim 12, further comprising monitoring a received signal strength indication (RSSI) output of said photodiodes.

19. The method of claim 18, further comprising adjusting said orientation of said photodetector mounting bar based on said RSSI.

20. The method of claim 12, wherein said optical demultiplexer comprises an arrayed waveguide grating (AWG).

21. The method of claim 12, further comprising affixing, with epoxy, said optical demultiplexer to a base portion of said ROSA housing, prior to said alignment.

22. The method of claim 12, further comprising affixing, with epoxy, said photodetector mounting bar to said base portion of said ROSA housing, after completion of said alignment.

* * * * *